United States Patent
Kitaoka et al.

(10) Patent No.: US 8,966,918 B2
(45) Date of Patent: Mar. 3, 2015

(54) CONSTRUCTION MACHINE AND CONTROL METHOD FOR COOLING FAN

(71) Applicant: Komatsu Ltd., Tokyo (JP)

(72) Inventors: Hiroyuki Kitaoka, Komatsu (JP); Kentaro Yajima, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/882,544

(22) PCT Filed: Oct. 12, 2012

(86) PCT No.: PCT/JP2012/076392
§ 371 (c)(1),
(2) Date: Apr. 30, 2013

(87) PCT Pub. No.: WO2014/006771
PCT Pub. Date: Jan. 9, 2014

(65) Prior Publication Data
US 2014/0060099 A1     Mar. 6, 2014

(30) Foreign Application Priority Data
Jul. 2, 2012   (JP) .................................. 2012-148903

(51) Int. Cl.
*F25B 39/04*     (2006.01)
*F25D 17/06*     (2006.01)
(Continued)

(52) U.S. Cl.
CPC  *F25D 17/06* (2013.01); *B60H 1/32* (2013.01); *F01P 7/04* (2013.01); *E02F 9/0866* (2013.01); *E02F 9/2235* (2013.01); *E02F 9/226* (2013.01); *E02F 9/2296* (2013.01); *B60H 1/00378* (2013.01); *B60H 1/00435* (2013.01); *B60H 1/00828* (2013.01); *B60H 2001/3261* (2013.01);
(Continued)

(58) Field of Classification Search
CPC ........... B60H 1/00378; B60H 1/00357; B60H 2001/3277
USPC ............... 62/177, 178, 180, 181, 183; 236/35
See application file for complete search history.

(56) References Cited

U.S. PATENT DOCUMENTS 6,622,502 B2 *   9/2003   Yeo ................................ 62/179
2005/0178132 A1   8/2005   Sakaguchi et al.
(Continued)

FOREIGN PATENT DOCUMENTS

| JP | 6-87324 A | 3/1994 |
|---|---|---|
| JP | 2001-182535 A | 7/2001 |
| JP | 2006-9966 A | 1/2006 |
| JP | 2007-106289 A | 4/2007 |
| JP | 2007-127036 A | 5/2007 |
| JP | 2008-128039 A | 6/2008 |

OTHER PUBLICATIONS

The extended European Search Report for the corresponding European application No. 12852460.0, issued on May 8, 2014.

*Primary Examiner* — Jonathan Bradford
(74) *Attorney, Agent, or Firm* — Global IP Counselors, LLP (57) ABSTRACT

A wheel loader is provided with a cab, an air conditioning unit, a cooling fan which has a condenser and a compressor, an air conditioning switch which receives the operation or non-operation of the compressor, a temperature setting portion which sets a set temperature inside the cab, a room temperature sensor which detects a room temperature inside the cab, and a controller. In a case where the air conditioning switch is operated and the room temperature is higher than a set temperature, the controller maintains the rotation amount of the cooling fan at a limited rotation amount or more.

6 Claims, 7 Drawing Sheets (51) Int. Cl.
*B60H 1/32* (2006.01)
*F01P 7/04* (2006.01)
*E02F 9/08* (2006.01)
*E02F 9/22* (2006.01)
*B60H 1/00* (2006.01)

(52) U.S. Cl.
CPC ......... *B60H 2001/3277* (2013.01); *F01P 7/044* (2013.01)
USPC .............................................. 62/181; 62/183

(56) References Cited

U.S. PATENT DOCUMENTS

| 2006/0062678 | A1  | 3/2006 | Furuta et al. | |
| 2008/0022704 | A1* | 1/2008 | Fukuta | 62/172 |
| 2009/0025661 | A1* | 1/2009 | Itoga et al. | 123/41.12 |
| 2009/0217655 | A1* | 9/2009 | Yabuki | 60/456 |

* cited by examiner

CONSTRUCTION MACHINE AND CONTROL METHOD FOR COOLING FAN

CROSS-REFERENCE TO RELATED APPLICATIONS

This application claims priority to Japanese Patent Application No. 2012-148903 filed on Jul. 2, 2012, the disclosure of which is hereby incorporated herein by reference in its entirety.

BACKGROUND

1. Technical Field

The present invention relates to a construction machine, which is provided with an air conditioner, and a control method for a cooling fan.

2. Background Information

In the prior art, in construction machines such as wheel loaders, a method has been proposed which controls the rotational speed of a fan which cools a radiator, an operating oil cooler, and an after cooler based on the water temperature of the radiator, the oil temperature of the operating oil cooler, and the air temperature of the after cooler (refer to Japanese Laid-Open Patent Application No. 2008-128039).

SUMMARY

However, in the method of Japanese Laid-Open Patent Application No. 2008-128039, since the operation status of the air conditioner is not considered, there is a concern that it will not be possible to stably cool the cab interior. Specifically, even in a case where an operator wants to rapidly lower the temperature inside the cab, it is not possible to efficiently cool the cab interior when the rotational speed of the fan is limited to being low since the water temperature and the oil temperature are low.

The present invention has been made in consideration of the circumstances described above and has the object of providing a construction machine and a control method for a cooling fan where it is possible to stably cool a cab interior.

A construction machine according to a first aspect of the present invention is provided with a cab, an air conditioning unit, a cooling fan, an air conditioning switch, a temperature setting section, a room temperature sensor, and a controller. The air conditioning unit has a condenser, a compressor which is connected to the condenser, an evaporator which is connected to the condenser and the compressor, a blower fan which blows a wind to the evaporator, and an air conditioning duct which communicates from the evaporator to the inside of the cab. The cooling fan cools the condenser. The air conditioning switch receives the operation or non-operation of the condenser. The temperature setting section sets a set temperature inside the cab. The room temperature sensor detects the room temperature inside the cab. The controller adjusts so that the rotational speed of the cooling fan is maintained at a predetermined rotational speed or more when operation is selected in the air conditioning switch and the room temperature inside the cab is higher than the set temperature.

According to the construction machine in relation to a first aspect of the present invention, it is possible to maintain the cooling efficiency of a refrigerant in the condenser, and maintain the cooling effect of the air from the evaporator to a necessary minimum level. As a result, it is possible to rapidly cool the inside of the cab according to a request of the operator.

In a construction machine in relation to a second aspect of the present invention, in relation to the first aspect, there is provided a radiator for cooling the refrigerant which circulates in an engine, a pipe which is connected to the radiator and which flows the refrigerant, and a hydraulic pump which drives the cooling fan. A portion of the pipe is arranged inside the air conditioning duct. The hydraulic pump has a swash plate for adjusting the amount of oil which is sent to the cooling fan. The controller is configured to set an angle of the swash plate of the hydraulic pump to a minimum when non-operation is selected in the air conditioning switch or when the room temperature inside the cab is not higher than the set temperature and the temperature of the refrigerant is a predetermined temperature or less.

According to the construction machine in relation to the second aspect of the present invention, it is possible to reduce the cooling efficiency of the refrigerant in the radiator and to raise the temperature of the refrigerant which flows through the pipe. Since a refrigerant is used in the heating inside the cab, it is possible to achieve the maximum heating effect of the air by quickly raising the temperature of the refrigerant. As a result, it is possible to rapidly warm the inside of the cab according to a request of the operator.

In the construction machine in relation to a third aspect of the present invention, in relation to the first aspect, there is provided a radiator for cooling a refrigerant which circulates in an engine, a torque converter oil cooler for cooling torque converter oil which circulates in a torque converter, and an operating oil cooler for cooling operating oil which drives a working unit. The radiator, the torque converter oil cooler, and the operating oil cooler are cooled by the cooling fan. The controller rotates the cooling fan at the largest rotational speed among the three rotational speeds which respectively correspond to the temperatures of the refrigerant, the torque converter oil, and the operating oil.

According to the construction machine in relation to the third aspect of the present invention, it is possible to sufficiently cool the radiator, the operating oil cooler, and the torque converter oil cooler together as necessary.

Here, the torque converter oil cooler may be directly cooled by the cooling fan, but when the torque converter oil cooler cools the torque converter oil by using the refrigerant of the radiator, the torque converter oil cooler is cooled indirectly by the cooling fan.

In a construction machine in relation to a fourth aspect of the present invention, in relation to the third aspect, the maximum rotational speed of the cooling fan is set to a first maximum rotational speed when an engine rotational speed is from a low idling rotational speed to a first rotational speed which is higher than the low idling rotational speed, the maximum rotational speed is set so as to increase gradually when the engine rotational speed is from the first rotational speed to a second rotational speed which is higher than the first rotational speed, and the maximum rotational speed is set to a second maximum rotational speed which is higher than the first maximum rotational speed when the engine rotational speed is higher than the second rotational speed.

According to the construction machine in relation to the fourth aspect of the present invention, the cooling fan is maintained at the first maximum rotational speed from the low idling rotational speed to the first rotational speed. As a result, it is possible to suppress variation in the rotational speed of the cooling fan even when the engine rotational speed changes in the vicinity of the low idling rotational speed. Accordingly, it is possible to suppress the frequent driving of the hydraulic pump and the accompanying noise.

A control method for a cooling fan in relation to a fifth aspect of the present invention is used in a construction machine which has a cab, an air conditioning unit which air conditions inside the cab, a temperature setting section which sets a set temperature inside the cab, and a cooling fan for cooling a condenser of the air conditioning unit. In the control method for the cooling fan, there is controlling the minimum rotational speed of the cooling fan to a predetermined rotational speed when the air conditioning unit receives an operation signal and the room temperature inside the cab is higher than a set temperature.

According to the control method for the cooling fan in relation to the fifth aspect of the present invention, it is possible to rapidly cool the inside of the cab according to a request of the operator as a result of the cooling efficiency of the refrigerant in the condenser being maintained.

In a control method for the cooling fan in relation to a sixth aspect of the present invention, in relation to the fifth aspect, the capacity of the hydraulic pump is set to the minimum when the air conditioning unit does not receive the operation signal or when the room temperature inside the cab is a set temperature or less. However, it is possible to control the rotational speed of the cooling fan according to capacity adjustment of the hydraulic pump.

According to the control method for the cooling fan according to the sixth aspect of the present invention, it is possible to reduce the cooling efficiency of the refrigerant in the radiator and to achieve the maximum heating effect of the air by quickly raising the temperature of the refrigerant. As a result, it is possible to rapidly warm the inside of the cab according to a request of the operator.

According to the present invention, it is possible to provide a construction machine and a control method for a cooling fan where it is possible to stably cool a cab interior.

DETAILED DESCRIPTION OF EMBODIMENTS

Figure 1:
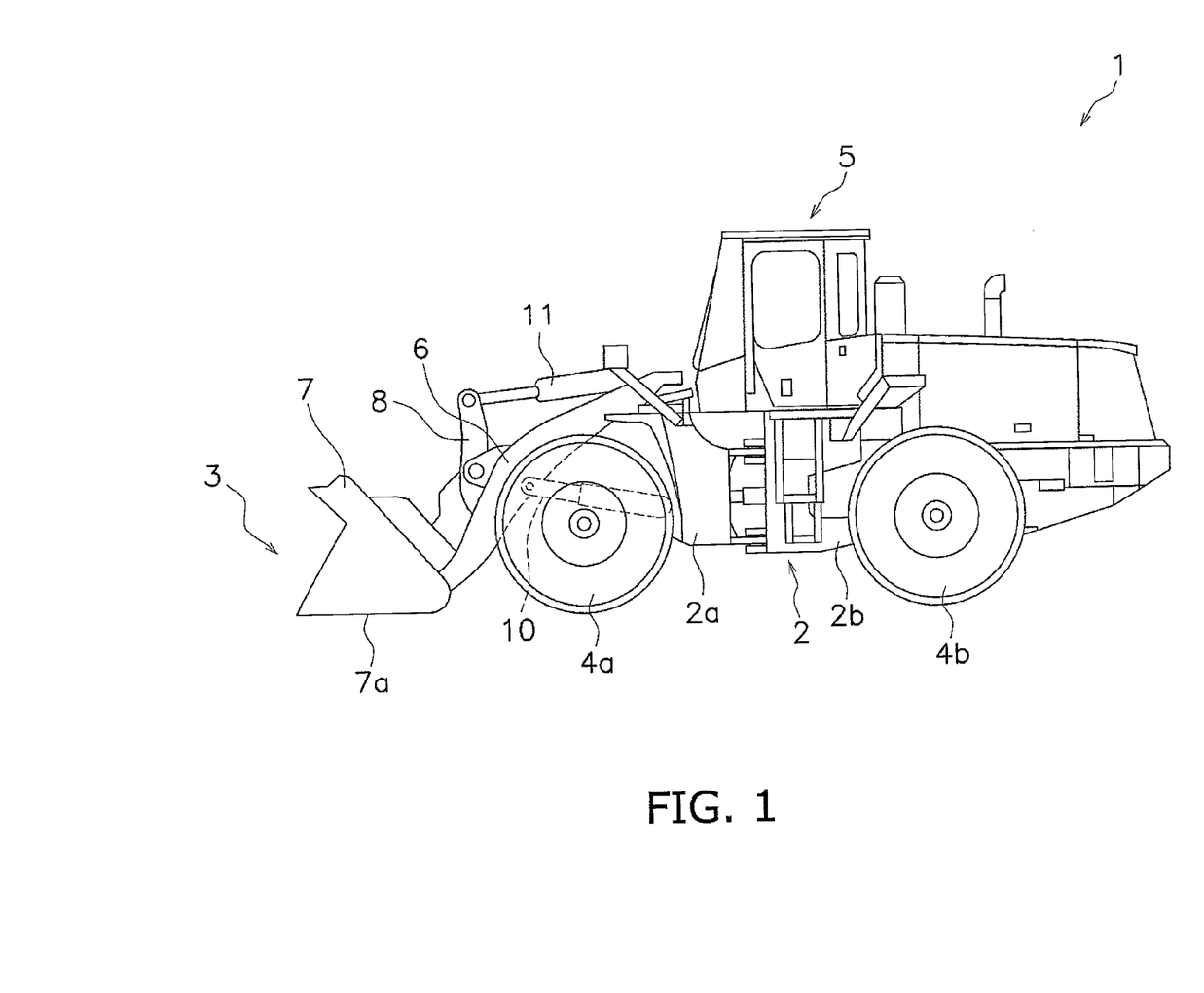
FIG. 1 is a side surface diagram of a wheel loader.
Figure 2:
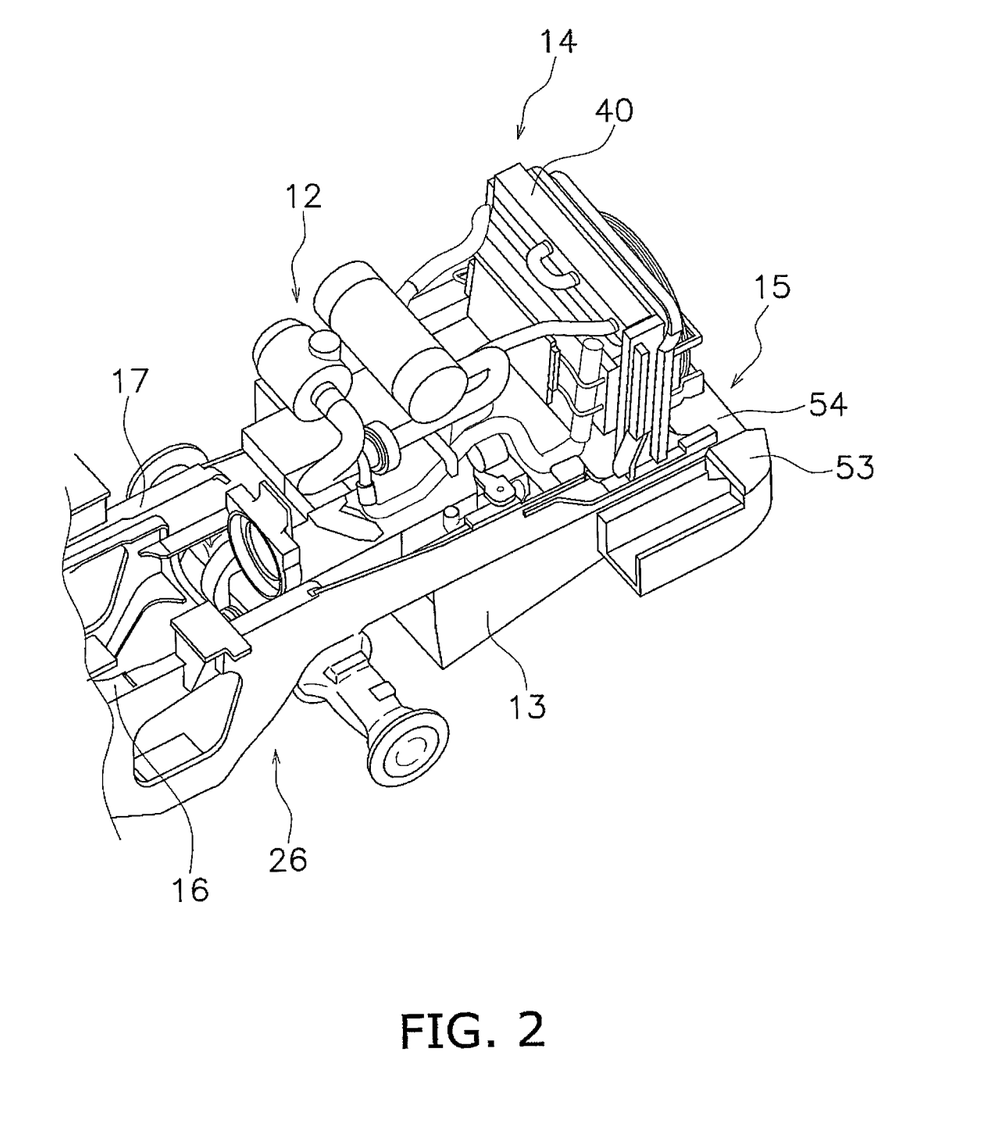
FIG. 2 is a perspective diagram of a configuration of a rear portion of the wheel loader.
Figure 3:
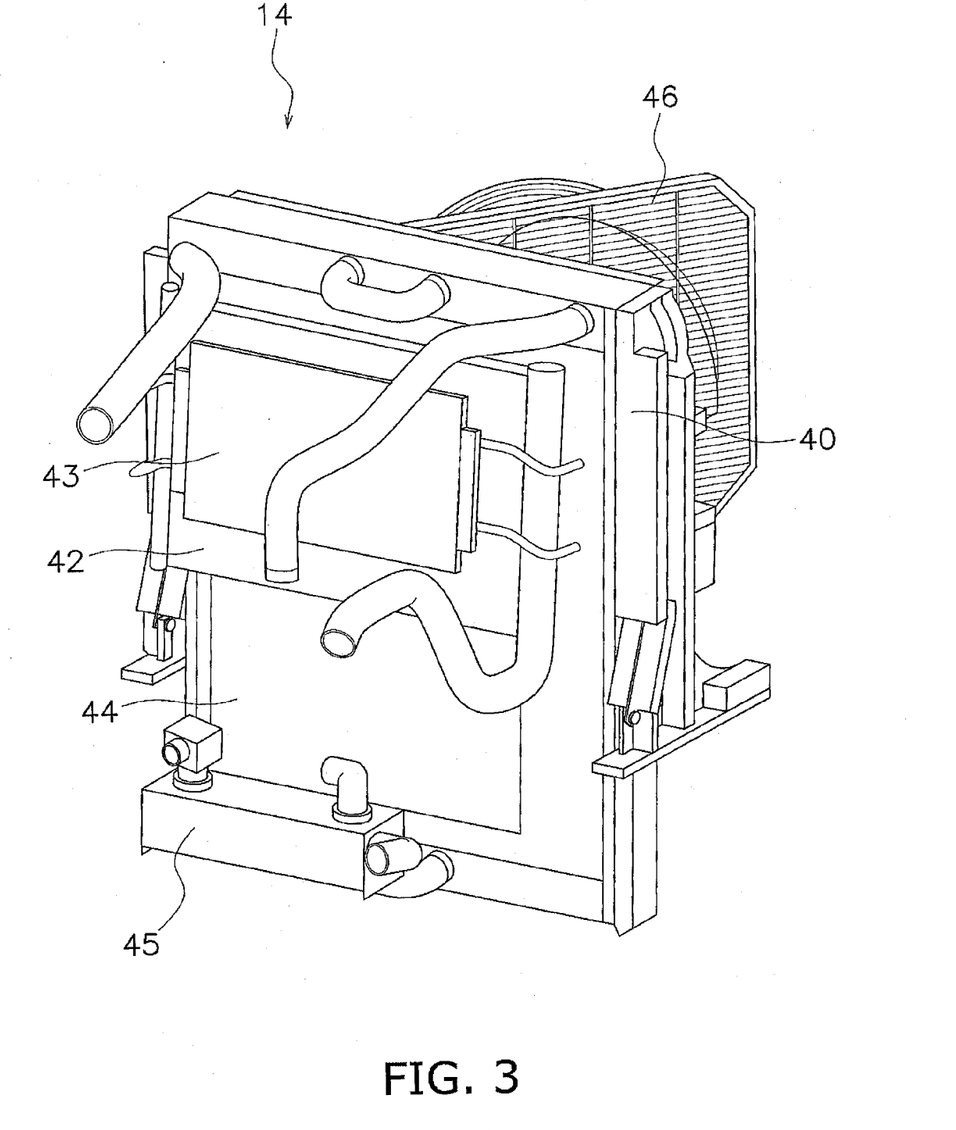
FIG. 3 is a perspective diagram of a cooling unit.

FIG. 1 illustrates an external side surface diagram of a wheel loader according to a first embodiment of the present invention, and FIG. 2 and FIG. 3 illustrate the configuration of a rear portion thereof.

Here, in the following description, forward, back, left and right refer to the same directions as forward, back, left and right in a state where the operator is seated in the driver's seat inside a cab 5 shown in FIG. 1.

Overall Configuration

A wheel loader 1 is provided with a vehicle body frame 2, a working unit 3, front wheels 4a, rear wheels 4b, and the cab 5. The wheel loader 1 is mounted with a cooling fan control system 100 (refer to FIG. 4). The cooling fan control system 100 will be described later.

The wheel loader 1 is capable of self-propulsion according to the rotational driving of the front wheels 4a and the rear wheels 4b, and it is possible to perform desired work using the working unit 3.

The vehicle body frame 2 has a front body section 2a and a rear body section 2b. The front body section 2a and the rear body section 2b are linked to each other to be able to swing in the left and right direction. The front body section 2a is provided with the working unit 3 and the front wheels 4a. The rear body section 2b is provided with the cab 5 and the rear wheels 4b.

An air conditioning operation panel 80 and a room temperature sensor 90 (refer to FIG. 5) which will be described later are arranged inside the cab 5. The working unit 3 is arranged at the front of the front body section 2a and has a boom 6, a bucket 7, a bell crank 8, and the like. The boom 6 is swung up and down by a pair of lift cylinders 10. In addition, the bucket 7 is mounted on the tip end of the boom 6 and is swung up and down by a bucket cylinder 11 through the bell crank 8.

Overall Configuration of Rear Section

As shown in FIG. 2, an engine 12 is mounted at the rear section of the rear body section 2b and a fuel tank 13 is arranged below the engine 12. In addition, a cooling unit 14 is arranged at the rear of the engine 12. Furthermore, a counterweight 15 is fixed to a rear end of the rear body section 2b.

Cooling Unit 14

As shown in FIG. 3, the cooling unit 14 has a radiator 40, an after cooler 42, a condenser 43, an operating oil cooler 44, a torque converter oil cooler 45, and a cooling fan 46. Here, FIG. 3 illustrates a state where the cooling fan 46 is rotated in the horizontal direction in order to clean the radiator 40.

The radiator 40 is arranged at the front surface side of the cooling fan 46. The radiator 40 cools refrigerant which circulates in the engine 12.

The after cooler 42 is arranged on the front surface side of the radiator 40. The after cooler 42 cools the air which is supplied to the engine 12.

The condenser 43 is arranged in front of the after cooler 42. The condenser 43 configures a portion of an air conditioning unit 60 (refer to FIG. 4) which will be described later. The condenser 43 cools the refrigerant which circulates in an evaporator 63 (refer to FIG. 4) which will be described later.

The operating oil cooler 44 is arranged below the after cooler 42. The operating oil cooler 44 cools the operating oil which drives the working unit 3.

The torque converter oil cooler 45 is arranged below the operating oil cooler 44. The torque converter oil cooler 45 cools torque converter oil which circulates in the torque converter which is not shown. The torque converter oil cooler 45 is cooled by the circulation of the refrigerant sent from the radiator 40.

The cooling fan 46 is arranged at the rear surface side of the radiator 40. A cooling wind is generated toward the rear by the rotation of the cooling fan 46. Due to this, the radiator 40, the after cooler 42, the condenser 43 and the operating oil cooler 44 are cooled.

Configuration of Cooling Fan Control System 100

Figure 4:
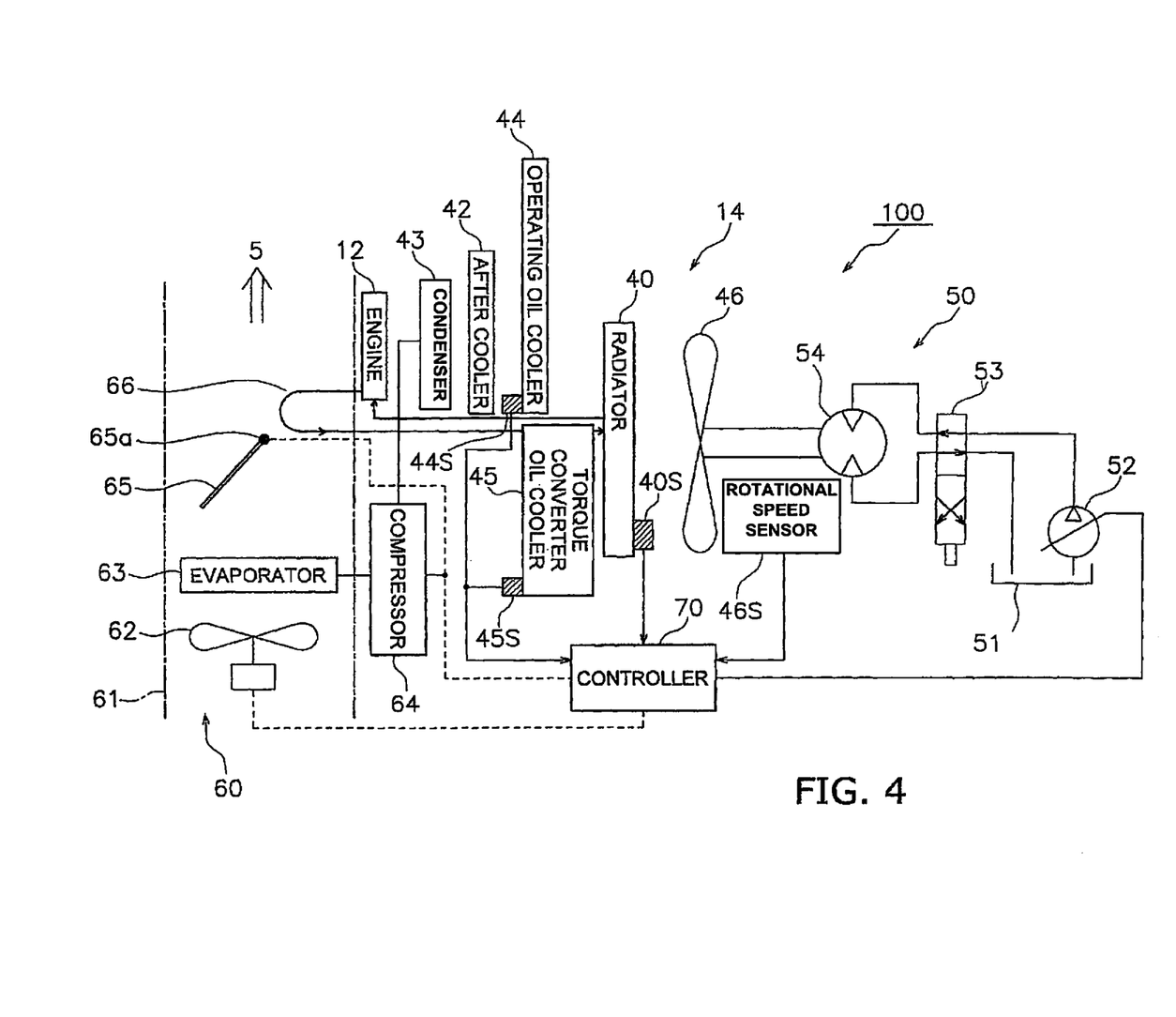
FIG. 4 is a configuration diagram of a cooling fan control system.

The configuration of the cooling fan control system 100 will be described with reference to the diagrams. FIG. 4 is a block diagram illustrating the configuration of the cooling fan control system 100.

The cooling fan control system 100 is provided with the cooling unit 14 described above, a hydraulic circuit 50, the air conditioning unit 60, and a controller 70.

The cooling unit 14 includes the radiator 40, the after cooler 42, the condenser 43, the operating oil cooler 44, the torque converter oil cooler 45, and the cooling fan 46. The radiator 40 is provided with a refrigerant temperature sensor 40S which detects the temperature of the refrigerant inside the radiator 40. The operating oil cooler 44 is provided with an operating oil temperature sensor 44S which detects the operating oil temperature inside the operating oil cooler 44. The torque converter oil cooler 45 is provided with a torque converter oil temperature sensor 45S which detects the torque converter oil temperature inside the torque converter oil cooler 45.

Here, each of the temperature sensors need not necessarily be provided in the radiator 40, the operating oil cooler 44 and the torque converter oil cooler 45 as long as it is possible to detect the temperature of the target fluid.

The hydraulic circuit 50 has a tank 51, a hydraulic pump 52, a switching valve 53, and a hydraulic motor 54.

The tank 51 stores hydraulic pressure which is sent to the hydraulic motor 54. Oil is returned from the switching valve 53 into the tank 51.

The hydraulic pump 52 is driven by being linked to the engine 12 (refer to FIG. 2). The hydraulic pump 52 sends hydraulic pressure from the tank 51 to the switching valve 53. The hydraulic pump 52 is a variable capacity type pump which has a swash plate 52a. The pump capacity of the hydraulic pump 52 changes according to the angle of the swash plate 52a. The angle of the swash plate 52a is adjusted by the controller 70. The pump capacity of the hydraulic pump 52 is reduced as the angle of the swash plate 52a is reduced.

The switching valve 53 switches the direction of the hydraulic pressure which flows in the hydraulic motor 54. The switching valve 53 is a two-position switching valve which has a forward position and a reverse position. In a case where the switching valve 53 is positioned in the forward position, rotational force is applied to the hydraulic motor 54 in the forward rotation direction. In a case where the switching valve 53 is positioned in the reverse position, rotational force is applied to the hydraulic motor 54 in the opposite direction to the forward rotation direction.

The hydraulic motor 54 rotationally drives the cooling fan 46 according to the supply of the hydraulic pressure. The hydraulic motor 54 is a fixed capacity type motor. When the rotational force is generated in the forward rotation direction in the hydraulic motor 54, a wind is generated toward the rear according to the rotation of the cooling fan 46. When the rotational force is generated in the reverse rotation direction in the hydraulic motor 54, a wind is generated toward the front according to the rotation of the cooling fan 46. The cooling fan 46 is provided with a rotational speed sensor which detects the rotational speed of the cooling fan 46.

The air conditioning unit 60 has an air conditioning duct 61, a blower fan 62, the evaporator 63, a compressor 64, a partition plate 65, and a pipe 66.

The air conditioning duct 61 passes through a blowing outlet inside the cab 5. The blower fan 62 blows a wind to the evaporator 63. The evaporator 63 is arranged in an inner portion of the air conditioning duct 61. The refrigerant which is sent from the condenser 43 is circulated in the evaporator 63. The evaporator 63 cools the air which is blown from the blower fan 62.

The compressor 64 pumps the refrigerant to the evaporator 63. The operation or non-operation of the compressor 64 is switched by an air conditioning switch 83 (refer to FIG. 5) which will be described later. The partition plate 65 is arranged downstream of the evaporator 63 inside the air conditioning duct 61. By rotating the partition plate 65 around an axis 65a, the amount of cool air which heads from the evaporator 63 toward the pipe 66 is adjusted.

The pipe 66 is connected to the radiator 40. Inside the pipe 66, there is a flow of high temperature refrigerant which is returned to the radiator 40 from the engine 12. A portion of the pipe 66 is arranged downstream of the partition plate 65 inside the air conditioning duct 61. Accordingly, the air which is cooled by the evaporator 63 is sent to the inside of the cab 5 after being warmed by the pipe 66.

The controller 70 acquires detection values from the refrigerant temperature sensor 40S, the operating oil temperature sensor 44S, the torque converter oil temperature 45S and the rotational speed sensor 46S. In addition, the controller 70 controls the swash plate 52a of the hydraulic pump 52, the blower fan 62, the compressor 64, and the partition plate 65. The configuration and functions of the controller 70 will be described later.

Configuration of Controller 70

Figure 5:
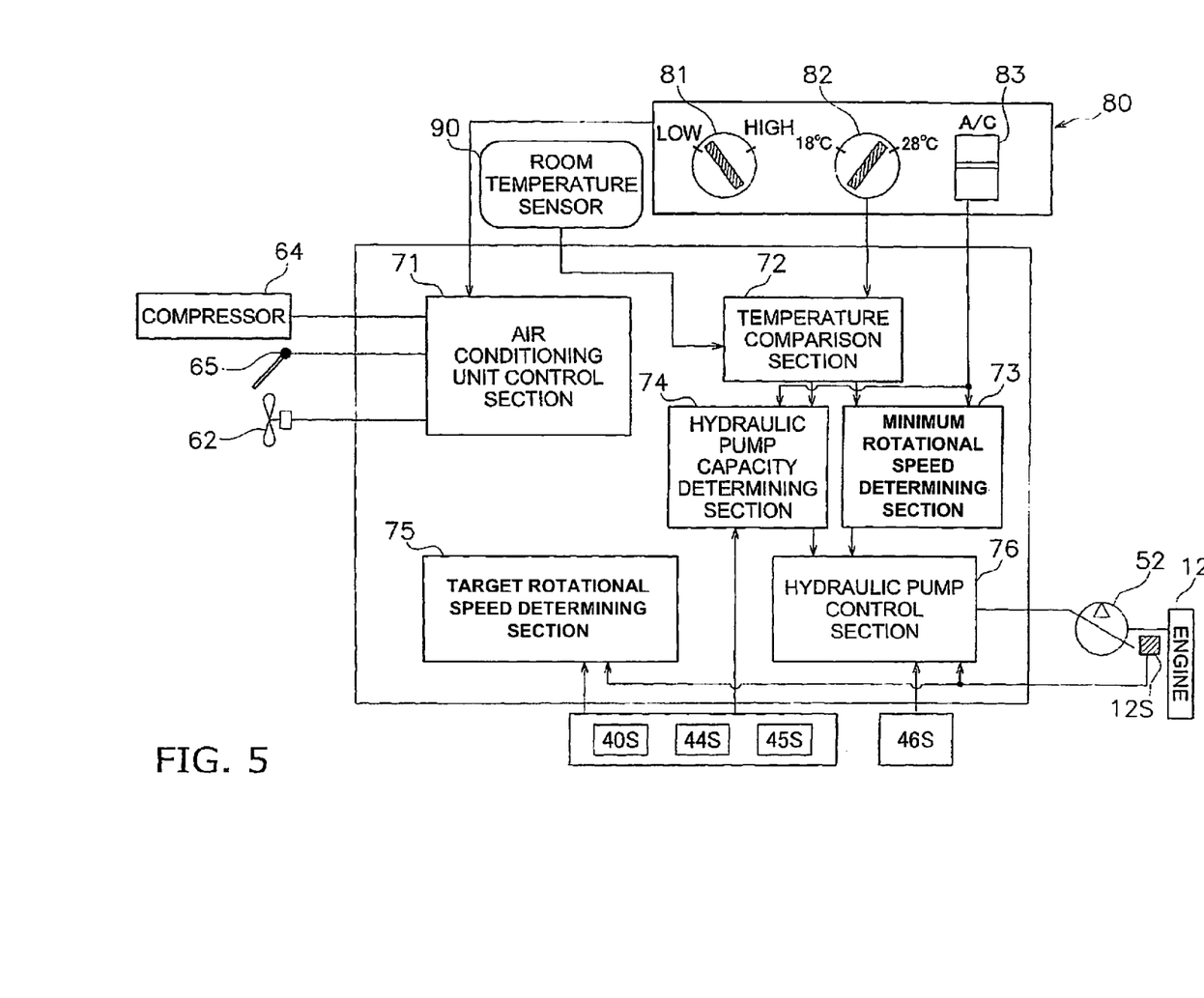
FIG. 5 is a configuration diagram of a controller.
Figure 6:
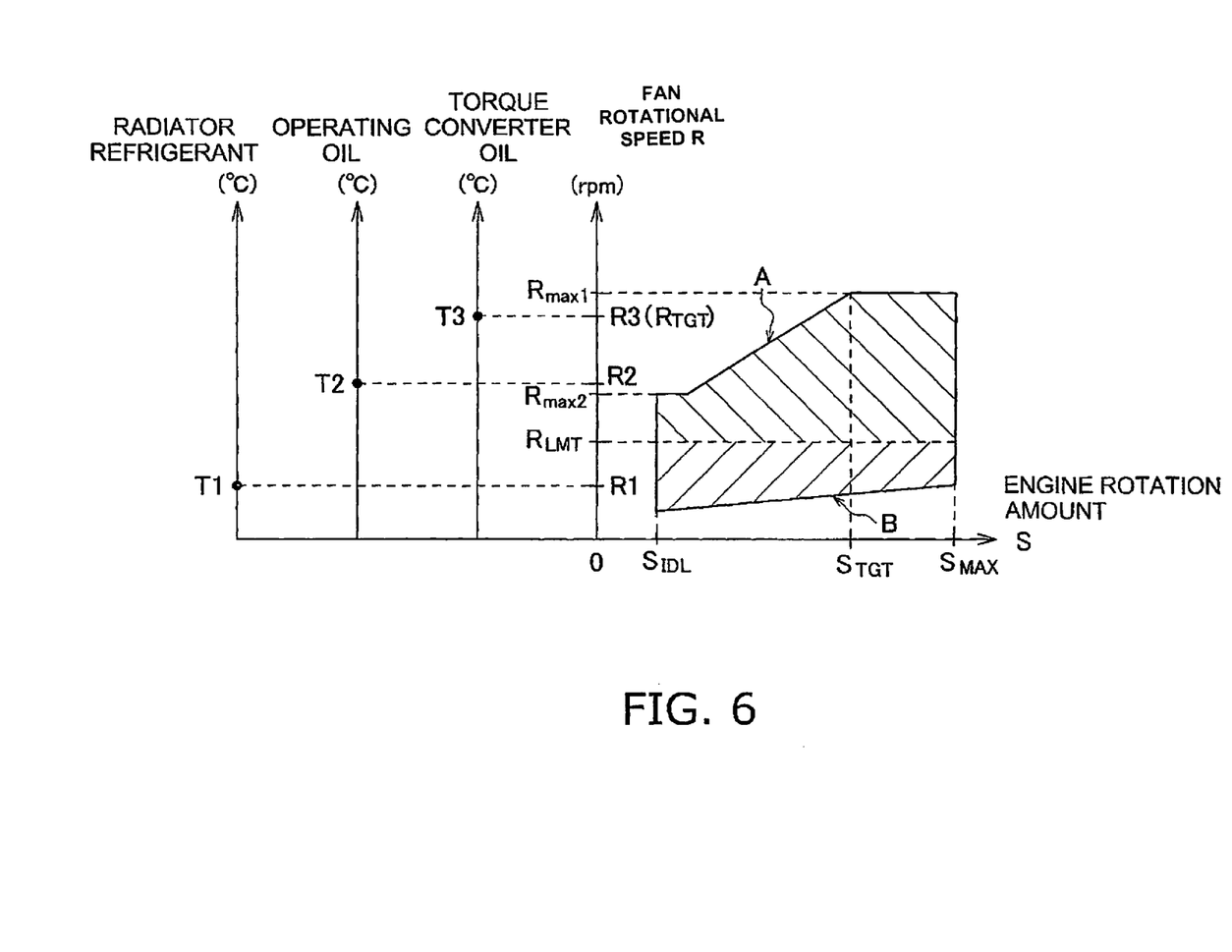
FIG. 6 is a graph illustrating a relationship between the rotational speed of the cooling fan and the engine rotational speed.

The configuration of the controller 70 will be described with reference to the diagrams. FIG. 5 is a block diagram illustrating the configuration of the controller 70. FIG. 6 is a map illustrating a relationship between the rotational speed R of the cooling fan 46 which is controlled by the controller 70 and the rotational speed S of the engine 12. FIG. 6 also illustrates a relationship between temperature of the refrigerant and temperature of the oil and the rotational speed R of the cooling fan 46.

As shown in FIG. 5, the controller 70 is connected to the air conditioning operation panel 80 and the room temperature sensor 90. The air conditioning operation panel 80 is provided with a set wind amount receiving section 81, a temperature setting section 82, and the air conditioning switch 83.

The set wind amount receiving section 81 receives a set wind amount as desired by the operator. The temperature setting section 82 sets the set temperature inside the cab 5 as desired by the operator.

The air conditioning switch 83 receives operation or non-operation of the compressor 64. Normally, in a case where the operator cools the inside of the cab 5, the compressor 64 is operated for dehumidification. Here, the room temperature sensor 90 detects the room temperature inside the cab 5.

As shown in FIG. 5, the controller 70 has an air conditioning unit control section 71, a temperature comparison section 72, a minimum rotational speed determining section 73, a hydraulic pump capacity determining section 74, a target rotational speed determining section 75, and a hydraulic pump control section 76.

The air conditioning unit control section 71 controls the rotational speed of the blower fan 62 according to the set wind amount which is received by the set wind amount receiving section 81. The air conditioning unit control section 71 controls the position of the partition plate 65 according to the set temperature which is set by the temperature setting section 82. The air conditioning unit control section 71 switches the operation or non-operation of the compressor 64 according to the operation or non-operation of the air conditioning switch 83.

The temperature comparison section 72 determines whether or not the room temperature inside the cab 5 which is detected by the room temperature sensor 90 is higher than the set temperature which is set by the temperature setting section 82. The temperature comparison section 72 notifies the minimum rotational speed determining section 73 and the hydraulic pump capacity determining section 74 of the determination result.

The minimum rotational speed determining section 73 acquires the information on the operation or non-operation of the air conditioning switch 83 and the determination result of the temperature comparison section 72. Then, the minimum rotational speed determining section 73 determines whether or not the following two conditions I and II are satisfied.

(Condition I): that operation is selected in the air conditioning switch 83.

(Condition II): that the room temperature inside the cab 5 is higher than the set temperature.

In a case where both of the conditions I and II are satisfied, that is, a case where the operator desires to cool the inside of the cab 5, the minimum rotational speed determining section 73 notifies the hydraulic pump control section 76 that the minimum rotational speed of the cooling fan 46 is to be maintained at a predetermined limited rotational speed $R_{LMT}$. The predetermined limited rotational speed $R_{LMT}$ may be set to a rotational speed which is the minimum necessary for it to be possible to cool the condenser 43.

In addition to the information on the operation or non-operation of the air conditioning switch 83 and the determination result of the temperature comparison section 72, the hydraulic pump capacity determining section 74 acquires the detection values of the refrigerant temperature sensor 40S, the operating oil temperature sensor 44S, and the torque converter oil temperature sensor 45S. Then, the hydraulic pump capacity determining section 74 determines whether or not the following two conditions III and IV are satisfied.

(Condition III): that non-operation is selected in the air conditioning switch 83 or the room temperature inside the cab 5 is not higher than the set temperature.

(Condition IV): that a refrigerant temperature T1 of the radiator 40 is lower than a first temperature TH1, an operating oil temperature T2 is lower than a second temperature TH2, and a torque converter oil temperature T3 is lower than a third temperature TH3.

In a case where both of the conditions III and IV are satisfied, that is, a case where it is thought that the operator wants to warm the inside of the cab 5, the hydraulic pump capacity determining section 74 notifies the hydraulic pump control section 76 that the angle of the swash plate 52a of the hydraulic pump 52 is to be set to the minimum.

The target rotational speed determining section 75 acquires the detection values from engine rotational speed sensor 12S, the refrigerant temperature sensor 40S, the operating oil temperature sensor 44S, and the torque converter oil temperature sensor 45S. The target rotational speed determining section 75 stores a map shown in FIG. 6, acquires a first candidate rotational speed R1 according to the refrigerant temperature T1 inside the radiator 40, acquires a second candidate rotational speed R2 according to the operating oil temperature T2 inside the operating oil cooler 44, and acquires a third candidate rotational speed R3 according to the torque converter oil temperature T3 inside the torque converter oil cooler 45. Each of the first to third candidate rotational speeds R1 to R3 may be set to be become faster as the refrigerant and oil temperatures T1 to T3 are higher.

Then, as shown in FIG. 6, the target rotational speed determining section 75 determines the largest rotational speed among the first to third candidate rotational speeds R1 to R3 as the target rotational speed $R_{TGT}$. In the example shown in FIG. 6, the third candidate rotational speed R3 is equivalent to the target rotational speed $R_{TGT}$. Here, in a case where the target rotational speed $R_{TGT}$ exceeds a maximum rotational speed line A (refer to FIG. 6) which is determined by the engine rotational speed, the target rotational speed determining section 75 sets a value above the maximum rotational speed line A as the target rotational speed $R_{TGT}$. The target rotational speed determining section 75 acquires the detected values of each of the sensors in real time and periodically updates the target rotational speed $R_{TGT}$.

Here, as shown in FIG. 6, the maximum rotational speed of the cooling fan 46 is different according to a rotational speed S of the engine 12. When the rotational speed S of the engine 12 is a predetermined rotational speed $S_{TGT}$ (an example of the second rotational speed) or more and the maximum rotational speed $S_{mAX}$ or less, the maximum rotational speed of the cooling fan 46 is set to the maximum rotational speed $R_{mAX1}$ (an example of the second maximum rotational speed).

In addition, at a low idling rotational speed $S_{IDL}$ of the engine 12, the maximum rotational speed of the cooling fan 46 is set to be a maximum rotational speed $R_{MAX2}$ (an example of the first maximum rotational speed) which is faster than the limited rotational speed $R_{LMT}$ and slower than the maximum rotational speed $R_{MAX1}$.

In addition, from the low idling rotational speed $S_{IDL}$ to an engine rotational speed value which is higher than a predetermined rotational speed value $\Delta S$, the maximum rotational speed of the cooling fan 46 is maintained at the maximum rotational speed $R_{MAX2}$. This is because the control becomes difficult and noise is also generated since it is necessary to constantly move the swash plate 52a of the hydraulic pump 52 when the rotational speed R of the cooling fan 46 varies in accordance with the rotational speed S of the engine 12 constantly varies even at the time of the low idling rotational speed $S_{IDL}$.

In addition, when the rotational speed S of the engine 12 is from $S_{TGT}+\Delta S$ (an example of the first rotational speed) to the predetermined rotational speed $S_{TGT}$ (an example of the second rotational speed), the maximum rotational speed of the cooling fan 46 increases from the maximum rotational speed $R_{mAX2}$ to the maximum rotational speed $R_{mAX1}$ in accordance with increases in the rotational speed S of the engine 12. In the example illustrated in FIG. 6, in a case where the rotational speed S of the engine 12 increases from $S_{TGT}+\Delta S$ to the rotational speed $S_{TGT}$, the maximum rotational speed of the cooling fan 46 is increased in a linear manner.

Here, in a case where the target rotational speed $R_{TGT}$ of the cooling fan 46 is higher than the maximum rotational speed of the cooling fan 46, the target rotational speed $R_{TGT}$ of the cooling fan 46 is replaced by the maximum rotational speed of the cooling fan 46.

The hydraulic pump control section 76 acquires the target rotational speed $R_{TGT}$, the detected value of the engine rotational speed sensor 12S and the detected value of the fan rotational speed sensor 46S in real time. Then, the hydraulic pump control section 76 performs feedback control of the swash plate 52a of the hydraulic pump 52 such that the detected value of the fan rotational speed sensor 46S becomes the target rotational speed $R_{TGT}$.

In addition, in a case where there is notification from the maximum rotational speed determining section 73 that the rotational speed R of the cooling fan 46 is to be maintained at the predetermined limited rotational speed $R_{LMT}$ or more, the hydraulic pump control section 76 continues to rotate the cooling fan 46 at the limited rotational speed $R_{LMT}$ even if the target rotational speed $R_{TGT}$ is lower than the limited rotational speed $R_{LMT}$. That is, it is also possible to say that the limited rotational speed $R_{LMT}$ is the lower limit value of the target rotational speed $R_{TGT}$. By the hydraulic pump control section 76 rotating the cooling fan 46 at the limited rotational speed $R_{LMT}$ or more, it is possible to maintain the cooling efficiency of the refrigerant in the condenser 43 and to maintain the cooling effect of the air due to the evaporator 63 at the necessary minimum level.

In a case where there is notification from the hydraulic pump capacity determining section 74 that the angle of the swash plate 52a of the hydraulic pump 52 is to be set to the minimum, the hydraulic pump control section 76 sets the angle of the swash plate 52a of the hydraulic pump 52 to the minimum. In FIG. 6, in a case where the angle of the swash plate 52a was set to the minimum, the rotational speed R of the cooling fan 46 moves along the minimum rotational speed line B. Due to this, the cooling fan 46 is rotated at the minimum rotational speed $R_{MIN}$. As shown in FIG. 6, the minimum rotational speed $R_{MIN}$ varies at a predetermined width according to the rotational speed of the engine 12 but is a lower value than the limited rotational speed $R_{LMT}$ in general. By the hydraulic pump control section 76 rotating the cooling fan 46 at the minimum rotational speed $R_{MIN}$, it is possible to reduce the cooling efficiency of the refrigerant in the radiator 40 and to increase the temperature of the refrigerant which flows in the pipe 66. As a result, it is possible to achieve the maximum heating effect of the air using the pipe 66.

Operation of Controller 70

Figure 7:
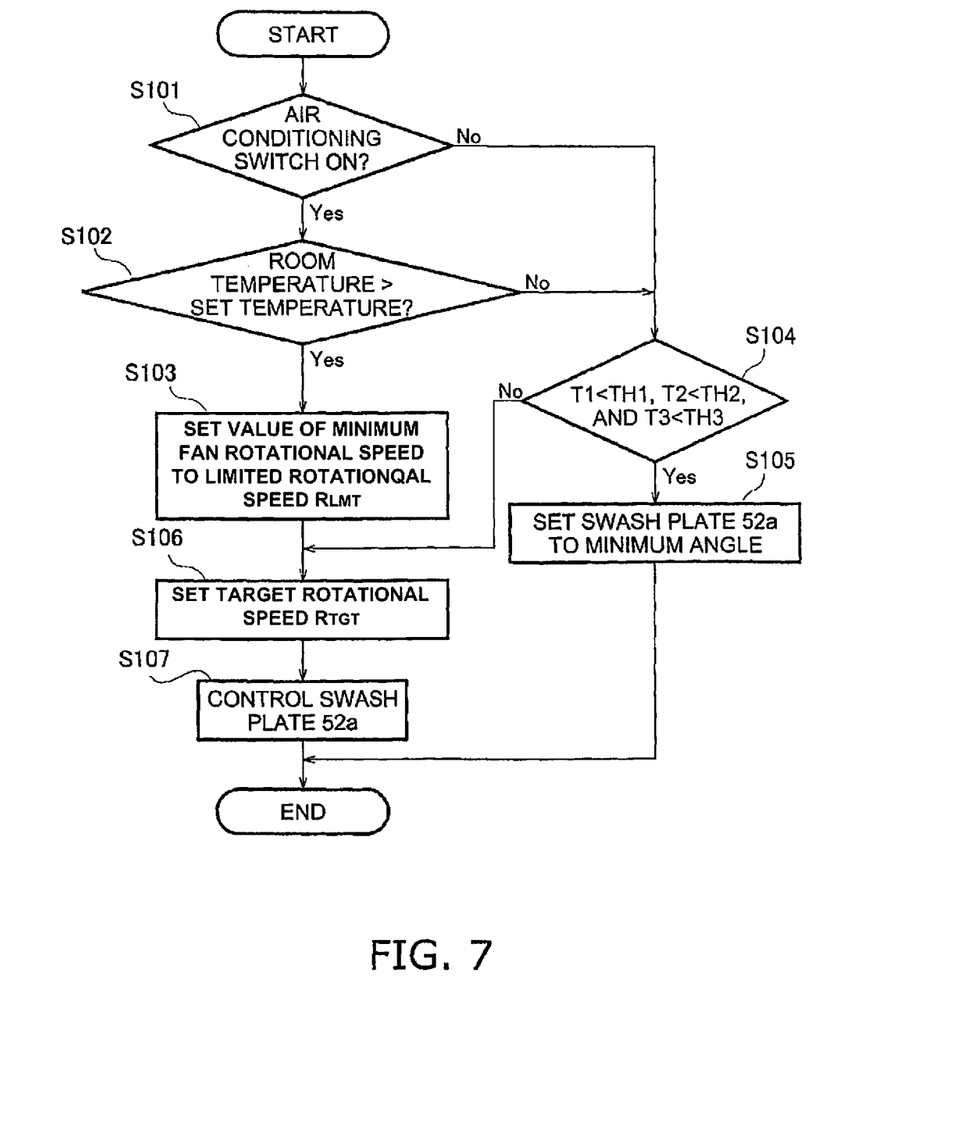
FIG. 7 is a flow chart for describing operations of a controller.

Next, the operation (control of the rotational speed of the fan) of the controller 70 will be described with reference to the diagrams. FIG. 7 is a flow chart for describing operations of the controller 70.

In Step S101, the controller 70 determines whether or not the air conditioning switch 83 is in operation. In a case where operation is selected in the air conditioning switch 83, the process proceeds to Step 102, and in a case where non-operation is selected in the air conditioning switch 83, the process proceeds to Step 104.

In Step S102, the controller 70 determines whether or not the room temperature inside the cab 5 is higher than the set temperature. In a case where the room temperature is higher than the set temperature, the process proceeds to Step 103, and in a case where the room temperature is not higher than the set temperature, the process proceeds to Step 104. Here, the proceeding of the process to Step 103 has the meaning that both of the conditions I and II described above are satisfied.

In Step S103, the controller 70 controls the swash plate 52a of the hydraulic pump 52 such that the rotational speed R of the cooling fan 46 is maintained at the predetermined limited rotational speed $R_{LMT}$ or more. Due to this, it is possible to maintain the cooling effect of the air at the minimum using the evaporator 63.

In Step S104, the controller 70 determines whether or not the refrigerant temperature T1 of the radiator 40 is lower than the first temperature TH1, the operating oil temperature T2 is lower than a second temperature TH2, and the torque converter oil temperature T3 is lower than a third temperature TH3. In a case where T1<TH1, T2<TH2, and T3<TH3, the process proceeds to Step S105. In a case where T1<TH1, T2<TH2, and T3<TH3 is not the case, the process proceeds to Step S106. Here, the proceeding of the process to Step 105 has the meaning that both of the conditions III and IV described above are satisfied.

In Step S105, the controller 70 sets the angle of the swash plate 52a of the hydraulic pump 52 to the minimum. Due to this, since the cooling fan 46 is rotated at the minimum rotational speed $R_{MIN}$ which is lower than the limited rotational speed $RLMT$, the temperature of the refrigerant which flows in the pipe 66 is increased. Thereafter, the process is finished and the process is repeated again from Step S101.

In Step S106, the controller 70 determines the target rotational speed $R_{TGT}$ based on the refrigerant temperature T1 of the radiator 40, the operating oil temperature T2, and the torque converter oil temperature T3. The target rotational speed $R_{TGT}$ is the largest rotational speed among the first to third candidate rotational speeds R1 to R3 which correspond to the temperatures T1 to T3 of the refrigerant and oils.

In Step S107, the controller 70 performs feedback control of the swash plate 52a of the hydraulic pump 52 such that the detected value of the fan rotational speed sensor 46S becomes the target rotational speed $R_{TGT}$. Thereafter, the process is finished and the process is repeated again from Step S101.

Characteristics

In a case where the conditions I and II described above are satisfied, the controller 70 controls the swash plate 52a of the hydraulic pump 52 such that the rotational speed R of the cooling fan 46 is maintained at a predetermined limited rotational speed $R_{LMT}$ or more. Accordingly, it is possible to maintain the cooling efficiency of the refrigerant in the condenser 43 and to maintain the cooling effect of the air due to the evaporator 63 at the necessary minimum level. As a result, it is possible to rapidly cool the inside of the cab 5 according to a request of the operator.

(2) In a case where the conditions III and IV described above are satisfied, the controller 70 sets the angle of the swash plate 52a of the hydraulic pump 52 to the minimum. Due to this, it is possible to reduce the cooling efficiency of the refrigerant in the radiator 40 and to increase the temperature of the refrigerant which flows in the pipe 66. As a result, it is possible to achieve the maximum heating effect of the air using the pipe 66. As a result, it is possible to rapidly warm the inside of the cab 5 according to a request of the operator.

(3) The controller 70 determines the largest rotational speed among the first to third candidate rotational speeds R1 to R3 which correspond to the refrigerant temperature T1 of the radiator 40, the operating oil temperature T2 and the torque converter oil temperature T3 as the target rotational speed $R_{TGT}$. Accordingly, it is possible to sufficiently cool the radiator 40, the operating oil cooler 44, and the torque converter oil cooler 45 together as necessary.

Other Embodiments

The present invention is not limited to the embodiment described above, and various modifications and alterations are possible without departing from the scope of the present invention.

For example, in the embodiment described above, description was given using the wheel loader 1 as an example of a construction machine, but it is possible to use a hydraulic excavator, a bulldozer, or the like as an example of the construction machine.

In addition, in the embodiment described above, the cooling unit 14 has the radiator 40, the after cooler 42, the condenser 43, the operating oil cooler 44, the torque converter oil cooler 45, and the cooling fan 46, but is not limited to this. It is sufficient if the cooling unit 14 has at least the condenser 43 and the cooling fan 46.

In addition, in the embodiment described above, the (condition IV) was exemplified as the refrigerant temperature T1 of the radiator 40 being lower than the first temperature TH1, the operating oil temperature T2 being lower than the second temperature TH2, and the torque converter oil temperature T3 being lower than the third temperature TH3, but is not limited to this. The (condition IV) may be only that the refrigerant temperature T1 of the radiator 40 is lower than the first temperature TH1.

In addition, although not particularly mentioned in the embodiment described above, in a case where the temperature of the refrigerant inside the radiator 40 is lower than a predetermined value, a main line for sending the refrigerant from the engine 12 to the radiator 40 may be closed and the refrigerant may be sent to the radiator 40 by passing only through a line for removing air. Even in this case, in a case where conditions III and IV are met, it is possible to rapidly warm the interior of the cab 5 by reducing the rotational speed of the cooling fan 46.

Since the construction machine which is disclosed here is able to stably cool the cab interior, it is useful in the field of construction machines which include wheel loaders, hydraulic excavators, and bulldozers.

What is claimed is:

1. A construction machine comprising:
   a cab;
   an air conditioning unit having a condenser, a compressor, an evaporator, a blower fan, and an air conditioning duct, the compressor being connected to the condenser, the evaporator being connected to the condenser and the compressor, the blower fan being configured to blow wind to the evaporator, the air conditioning duct communicating from the evaporator to inside the cab;
   a radiator configured to cool a refrigerant which circulates in an engine;
   a cooling fan configured to cool the condenser and the radiator;
   a hydraulic pump configured to drive the cooling fan, the hydraulic pump being configured to be driven by the engine, the hydraulic pump being a variable capacity type pump;
   an air conditioning switch configured to switch between operation and non-operation of the compressor;
   a temperature setting section configured to set a set temperature inside the cab;
   a room temperature sensor configured to detect a room temperature inside the cab; and
   a controller configured to control a rotational speed of the cooling fan to be equal to or larger than a predetermined rotational speed upon determining that operation is selected by the air conditioning switch and the room temperature inside the cab is higher than the set temperature, the controller being further configured to control the rotational speed of the cooling fan to be lower than the predetermined rotational speed by setting a pump capacity of the hydraulic pump to a minimum upon determining the non-operation is selected by the air conditioning switch or upon determining the room temperature inside the cab is lower than or equal to the set temperature,
   the controller being further configured to:
      set a maximum rotational speed of the cooling fan to a first maximum rotational speed when an engine rotational speed is in a range spanning from a low idling rotational speed to a first rotational speed which is higher than the low idling rotational speed,
      set the maximum rotational speed so as to increase in accordance with increasing engine rotational speed upon determining the engine rotational speed is in a range spanning from the first rotational speed to a second rotational speed which is higher than the first rotational speed, and
      set the maximum rotational speed to a second maximum rotational speed which is higher than the first maximum rotational speed upon determining the engine rotational speed is higher than the second rotational speed.

2. The construction machine according to claim 1, further comprising:
   a pipe connected to the radiator, the pipe configured to flow the refrigerant, a portion of the pipe being arranged inside the air conditioning duct; and
   a refrigerant temperature sensor that detects a temperature of the refrigerant; and
   the controller being configured to control a rotational speed of the cooling fan to be minimum by setting a pump capacity of the hydraulic pump to a minimum upon determining that either the non-operation is selected by the air conditioning switch or the room temperature inside the cab is lower than or equal to the set temperature, and that the temperature of the refrigerant is lower than or equal to a first temperature.

3. The construction machine according to claim 1, further comprising:
   a torque converter oil cooler configured to cool torque converter oil which circulates in a torque converter; and
   an operating oil cooler configured to cool operating oil which drives a working unit,
   the torque convertor oil cooler and the operating oil cooler being cooled by the cooling fan, and
   the controller being configured to control a rotational speed of the cooling fan to be minimum by setting pump capacity of the hydraulic pump to a minimum upon determining the non-operation is selected by the air conditioning switch or upon determining the room temperature inside the cab is lower than or equal to the set temperature and the temperature of the refrigerant is lower than or equal to a first temperature and the temperature of the operating oil is lower than or equal to a second temperature and the temperature of the torque converter oil is lower than or equal to a third temperature.

4. The construction machine according to claim 3, wherein the controller is configured to rotate the cooling fan at the largest rotational speed among three rotational speeds which respectively correspond to the temperatures of the refrigerant, the torque converter oil and the operating oil.

5. A control method for a cooling fan in a construction machine, which has a cab, an air conditioning unit which air conditions inside the cab, a radiator configured to cool a refrigerant which circulates in an engine, a temperature setting section which sets a set temperature inside the cab, and a cooling fan for cooling a condenser of the air conditioning unit and the radiator, a variable capacity type hydraulic pump for driving the cooling fan and being driven by an engine, the method comprising:
   controlling a rotational speed of the cooling fan to be equal to or larger than a predetermined rotational speed upon determining that the air conditioning unit receives an operation signal and a room temperature inside the cab is higher than the set temperature;
   controlling the rotational speed of the cooling fan to be lower than the predetermined rotational speed by setting a pump capacity of the hydraulic pump to a minimum upon determining the non-operation is selected by the air conditioning switch or upon determining the room temperature inside the cab is lower than or equal to the set temperature;
   setting a maximum rotational speed of the cooling fan to a first maximum rotational speed when an engine rotational speed is in a range spanning from a low idling rotational speed to a first rotational speed which is higher than the low idling rotational speed;
   setting the maximum rotational speed so as to increase in accordance with increasing engine rotational speed upon determining the engine rotational speed is in a range spanning from the first rotational speed to a second rotational speed which is higher than the first rotational speed; and setting the maximum rotational speed to a second maximum rotational speed which is higher than the first maximum rotational speed upon determining the engine rotational speed is higher than the second rotational speed.

6. A construction machine comprising:

a cab;

an air conditioning unit having a condenser, a compressor, an evaporator, a blower fan, and an air conditioning duct, the compressor being connected to the condenser, the evaporator being connected to the condenser and the compressor, the blower fan being configured to blow wind to the evaporator, the air conditioning duct communicating from the evaporator to inside the cab;

a radiator configured to cool a refrigerant which circulates in an engine;

a cooling fan configured to cool the condenser and the radiator;

a hydraulic pump configured to drive the cooling fan, the hydraulic pump being configured to be driven by the engine, the hydraulic pump being a variable capacity type pump;

an air conditioning switch configured to switch between operation and non-operation of the compressor;

a temperature setting section configured to set a set temperature inside the cab;

a room temperature sensor configured to detect a room temperature inside the cab; and a controller configured to:

set a maximum rotational speed of the cooling fan to a first maximum rotational speed when an engine rotational speed is in a range spanning from a low idling rotational speed to a first rotational speed which is higher than the low idling rotational speed, set the maximum rotational speed so as to increase in accordance with increasing engine rotational speed upon determining the engine rotational speed is in a range spanning from the first rotational speed to a second rotational speed which is higher than the first rotational speed, and set the maximum rotational speed to a second maximum rotational speed which is higher than the first maximum rotational speed upon determining the engine rotational speed is higher than the second rotational speed.

* * * * *